(12) United States Patent
Koehler et al.

(10) Patent No.: US 6,708,513 B2
(45) Date of Patent: Mar. 23, 2004

(54) CO$_2$-MODULE FOR COOLING AND HEATING

(75) Inventors: Juergen Koehler, Sickte (DE); Nicholas Carsten Lemke, Braunschweig (DE)

(73) Assignee: Konvekta AG, Schwalmstadt (DE)

( * ) Notice: Subject to any disclaimer, the term of this patent is extended or adjusted under 35 U.S.C. 154(b) by 0 days.

(21) Appl. No.: 10/310,450

(22) Filed: Dec. 5, 2002

(65) Prior Publication Data

US 2003/0110787 A1 Jun. 19, 2003

(30) Foreign Application Priority Data

Dec. 13, 2001 (DE) .......................................... 101 61 254

(51) Int. Cl.$^7$ ................................................ B60H 1/32
(52) U.S. Cl. ...................... 62/244; 62/324.1; 62/DIG. 2
(58) Field of Search ...................... 62/244, 324.1–324.6, 62/DIG. 2

(56) References Cited

U.S. PATENT DOCUMENTS

| | | | |
|---|---|---|---|
| 4,641,502 A | * 2/1987 | Aldrich et al. | 62/244 |
| 4,732,011 A | * 3/1988 | Haiya | 62/244 |
| 5,184,474 A | * 2/1993 | Ferdows | 62/244 |
| 5,220,808 A | * 6/1993 | Mayer | 62/244 |
| 6,240,738 B1 | * 6/2001 | Kato et al. | 62/239 |
| 6,467,296 B2 | * 10/2002 | Fujii et al. | 62/324.6 |
| 6,550,265 B2 | * 4/2003 | Takeuchi et al. | 62/324.2 |
| 6,584,796 B2 | * 7/2003 | Itoh et al. | 62/324.1 |
| 6,591,624 B1 | * 7/2003 | Hesse | 62/244 |

FOREIGN PATENT DOCUMENTS

| | | |
|---|---|---|
| DE | 3531045 A1 | 3/1987 |
| DE | 19806654 A1 | 8/1999 |
| DE | 19829334 C1 | 10/1999 |
| DE | 19925827 C1 | 1/2001 |
| DE | 10006513 A1 | 8/2001 |
| EP | 0945290 A2 | 2/1999 |
| EP | 0969255 A2 | 6/1999 |
| WO | WO 97/27437 | 7/1997 |

\* cited by examiner

Primary Examiner—William E. Tapolcai
(74) Attorney, Agent, or Firm—Geoffrey A. Mantooth; Arthur F. Zobal

(57) ABSTRACT

The invention pertains to a climate control system for a motor vehicle (58) which comprises a compressor (14) and a corresponding compressor drive (16), an interior heat exchanger (18), an exterior heat exchanger (36), an expansion element (32) and, if so required, an internal heat exchanger (30). The device is realized in the form of a self-sufficient flat module (12) that is designed for cooling in a cooling mode and for heating in a heat pump mode. The compressor (16) consists of a high-output carbon dioxide compressor that has a small structural volume and is integrated into the module (12) together with the compressor drive (16). The carbon dioxide compressor (14) preferably has an external power control. The module (12) contains an energy connection (54) for only one form of energy in order to supply the drive of the module (12) with energy. The energy connection (54) preferably consists of an electric energy connection with only one voltage level or with several different voltage levels. The energy connection (54) may, for example, also consist of a hydraulic or a pneumatic energy connection.

12 Claims, 2 Drawing Sheets

$CO_2$-MODULE FOR COOLING AND HEATING

BACKGROUND OF THE INVENTION

The invention pertains to a climate control system for a motor vehicle which comprises a compressor and a corresponding compressor drive, an interior heat exchanger, an expansion element, an exterior heat exchanger and, if applicable, an internal heat exchanger.

DE 35 31 045 C2 discloses an air conditioning system that is mounted on the roof of a motor vehicle and contains an evaporator and a condenser which are arranged in a housing to be mounted on the roof, wherein the evaporator and the condenser are connected to one another and to a compressor that can be driven by means of a drive unit via corresponding lines. On its underside, the housing is provided with at least one outlet opening for the cooled air generated in the air conditioning system, wherein the housing is sealed relative to the roof of the motor vehicle with a peripheral seal arranged on the underside of the housing. The housing is detachably mounted on the roof of the motor vehicle by means of mounting elements. The compressor and the drive unit for the compressor are arranged in the housing of the air conditioning system. This known air conditioning system consists of a standard air conditioning system that is operated with R 134a. R 134a systems of this type have certain disadvantages with respect to their output capacity, efficiency and structural volume. In addition, with R 134a systems it is practically impossible to achieve comfortably raised air temperatures for heating the interior of a motor vehicle, e.g., a small bus, a van or a bus of conventional size. This is the reason why R 134a is currently not the standard refrigerant used in heat pump circuits for motor vehicle heaters.

WO 97 27 437 A1 describes a compression-type refrigerating system with a compressor, a gas cooler, an expansion device and an evaporator that are connected to one another in the form of a circuit that contains a refrigerant. In this known compression-type refrigerating system, the refrigerant filling level lies between 50 and 100% of the critical density of the refrigerant. Carbon dioxide is preferably used as the refrigerant in this case.

A system with a heat pump and an accumulator is known from EP 0 969 255 A2. In this known system, the heat pump contains a compressor, a high-temperature heat exchanger, an expansion device and a low-temperature heat exchanger that are connected to one another in the form of a circuit through which carbon dioxide flows as the working medium. The high-temperature heat exchanger is arranged in the region of the bottom side of the temperature-layered accumulator and realized in the form of a countercurrent heat exchanger that is arranged in a receptacle. A riser that extends to the region of the upper side of the accumulator with a riser outlet is connected in a fluidic fashion to the upper side of the receptacle. The high-temperature heat exchanger is preferably realized in the form of a lamellar tube bundle heat exchanger. A regulating device may be arranged in the riser in order to control the volume flow of the accumulator fluid to be heated.

DE 100 06 513 A1 discloses an air conditioning system for a motor vehicle with a refrigerant circuit, a coolant circuit, a refrigerant/coolant heat exchanger that couples these circuits in a heat-exchanging fashion and means for controlling the refrigerant flow in dependence on the operating mode, wherein the air conditioning system cannot only be operated in an air conditioning mode, but also in at least one heat pump or reheating mode. In this known air conditioning system, an internal combustion engine exhaust gas coolant/heat exchanger operates upstream of the refrigerant/coolant heat exchanger in the coolant circuit in at least the heat pump mode and/or the refrigerant/coolant heat exchanger functions in the reheating mode as a condenser/gas cooler that operates upstream of an intake air/coolant heat exchanger on the side of the coolant. A drying mode in which the intake air/refrigerant heat exchanger is dried with air transported in the opposite direction may be additionally or alternatively provided. The refrigerant used in this air conditioning system consists, for example, of R 134a or $CO_2$. The compressor of the refrigerant circuit is mechanically coupled to the internal combustion engine.

DE 198 06 654 A1 describes an air conditioning system for motor vehicles with a channel network that makes it possible to realize two operating circuits that have a common compressor and common expansion devices by switching over two flow dividers, wherein one operating circuit serves for cooling the passenger compartment of a motor vehicle and the other operating circuit serves for heating said passenger compartment. The heating circuit makes it possible to very rapidly heat the passenger compartment, namely while the internal combustion engine of the motor vehicle is still cold, because the circulating heat transfer medium is heated without inertia to a maximum heating temperature in the compressor. The channel network provided for cooling the internal combustion engine is a suitable heat source for this heating process, wherein both channel networks are coupled by a common heat exchanger. $CO_2$ is used as the heat transfer medium in this case. The compressor is rigidly connected to and driven by the internal combustion engine of the motor vehicle, i.e., without a clutch.

A method and a device for heating and for cooling the interior of a motor vehicle that is driven by an internal combustion engine is known from EP 0 945 290 A2. In the cooling mode, a medium circulates through a compressor, an ambient heat exchanger, a throttle device and an interior heat exchanger that are connected in series and form an integral closed circuit. A supercritical pressure is generated on the high-pressure side of the circuit, and a subcritical pressure is simultaneously generated on the low-pressure side of the circuit. In the heating mode, the high-pressure side of the circuit in the cooling mode becomes the low-pressure side, and the low-pressure side of the circuit in the cooling mode becomes the high-pressure side. The medium being circulated is conveyed into the interior heat exchanger under a supercritical pressure, wherein thermal energy is transferred to the air to be conveyed into the interior from the medium being circulated. This medium is also conveyed through an exhaust gas heat exchanger. $CO_2$ is preferably used as the medium being circulated. The compressor is driven by the internal combustion engine.

SUMMARY OF THE INVENTION

The invention is based on the objective of developing a climate control system of the initially described type which is designed for cooling in a cooling mode and for heating in a heat pump mode and has a superior capacity and efficiency, as well as a reduced structural volume, in comparison with standard systems, i.e., R 134a systems.

According to the invention, this objective is attained with the characteristics of claim 1, i.e., due to the fact that the device is realized in the form of a self-sufficient flat module that is designed for cooling in a cooling mode and for heating in a heat pump mode, wherein the compressor consists of a high-output carbon dioxide compressor that has a small structural volume and is integrated into the module together with the compressor drive, and wherein the module contains an energy connection for only one form of energy in order to supply the drive of the module with energy. The carbon dioxide compressor preferably consists of a compressor with external power control. The carbon dioxide compressor preferably has a diameter of approximately 100–120 mm such that a module of low structural height can be realized.

Carbon dioxide refrigeration provides advantages which make it possible to realize small, flat modules that are able to optimally cool in the cooling mode and to efficiently heat in the heat pump mode. Despite their small structural volume, carbon dioxide compressors have a high output such that they can be integrated into a climate control module together with the corresponding compressor drive. The compressor drive may be realized in the form of an electric motor. This electric motor may consist of a d.c. motor or a three-phase current motor. The compressor drive may also consist of a hermetic drive, a semi-hermetic drive or an open belt drive. Only one external energy connection is required on the module in order to supply the device with electric energy. In a motor vehicle with an internal combustion engine, the electric energy supply of the module may be realized in the form of a 42 V d.c. or a 380 V three-phase current, e.g., with the aid of the onboard network of the motor vehicle. For example, the compressor drive may be supplied with a 380 V three-phase current, and a blower and a fan of the device may be supplied with 24 V d.c. energy. In a fuel cell vehicle, the electric energy supply can be directly realized with the fuel cell of the motor vehicle. When using an open compressor drive, other drive systems, e.g., hydraulic or pneumatic drive systems, may also be considered.

Carbon dioxide compressors with an external power control advantageously solve the starting problem caused by the high turn-on torque, namely because the output can be continuously increased from 0% to 100%. The constant rotational speed and the external power control make it possible to utilize a capillary tube as the expansion element. This advantageously reduces the weight, as well as the costs. Carbon dioxide air conditioning and heat pump modules according to the invention have a higher output and are more efficient than R 134a systems. In addition, they have a smaller structural volume such that the modular design can only be sensibly realized with carbon dioxide. Significant advantages are achieved in the heat pump mode when using carbon dioxide, namely because carbon dioxide is much more efficient than R 134a. As mentioned above, it is practically impossible to achieve comfortably high air temperatures for interior heating purposes with R 134a systems. Another advantage of the device according to the invention can be seen in the fact that the pressure history in the compressor (lower pressure peaks) caused by the thermodynamic properties of the carbon dioxide has advantageous effects on noise development, i.e., the noise reduction. This means that the device according to the invention can be advantageously utilized for roof-mounted applications. Refrigerant connections for a compressor that is driven by the motor vehicle are eliminated, and water connections for operating the device in the heating mode are not required. The modular design with an external energy connection for a single form of energy, in particular, an electric energy connection for operating the device according to the invention, also provides the advantage that it can be removed by normal maintenance personnel—without training as refrigeration experts—and replaced with a new device if so required. In addition, it is possible to utilize inexpensive mass production parts, e.g., heat exchangers and compressors, from the passenger car sector. Another advantage is that the installation expenditure is significantly reduced because the complicated and costly installation of piping in the respective motor vehicle is eliminated.

Modules with refrigeration capacities between 1 and 10 kW can be realized and mounted on the roof of a motor vehicle in the number respectively required for achieving the desired total refrigeration and heating capacity for the motor vehicle due to the fact that a carbon dioxide compressor with a diameter of approximately 100–120 mm is preferably utilized in the device according to the invention. Said vehicle may consist of a small bus, a van or a bus of conventional size. The advantages attained by mounting the device on the roof of the motor vehicle can, among other things, be seen in the fact that the weight can be distributed over the front axle and/or the rear axle of the motor vehicle in a targeted fashion, that the blower of the interior heat exchanger can distribute the conditioned air into the interior of the motor vehicle from the top or, if the motor vehicle is provided with an air duct system, directly introduce the conditioned air into the interior, and that a simple supply of fresh air to the exterior heat exchanger can be realized.

Other details, characteristics and advantages are discussed below with reference to one embodiment of the heating and cooling device according to the invention which is illustrated in the figures, and with reference to one embodiment in which a series of such devices is utilized.

DETAILED DESCRIPTION OF THE INVENTION

Figure 1:
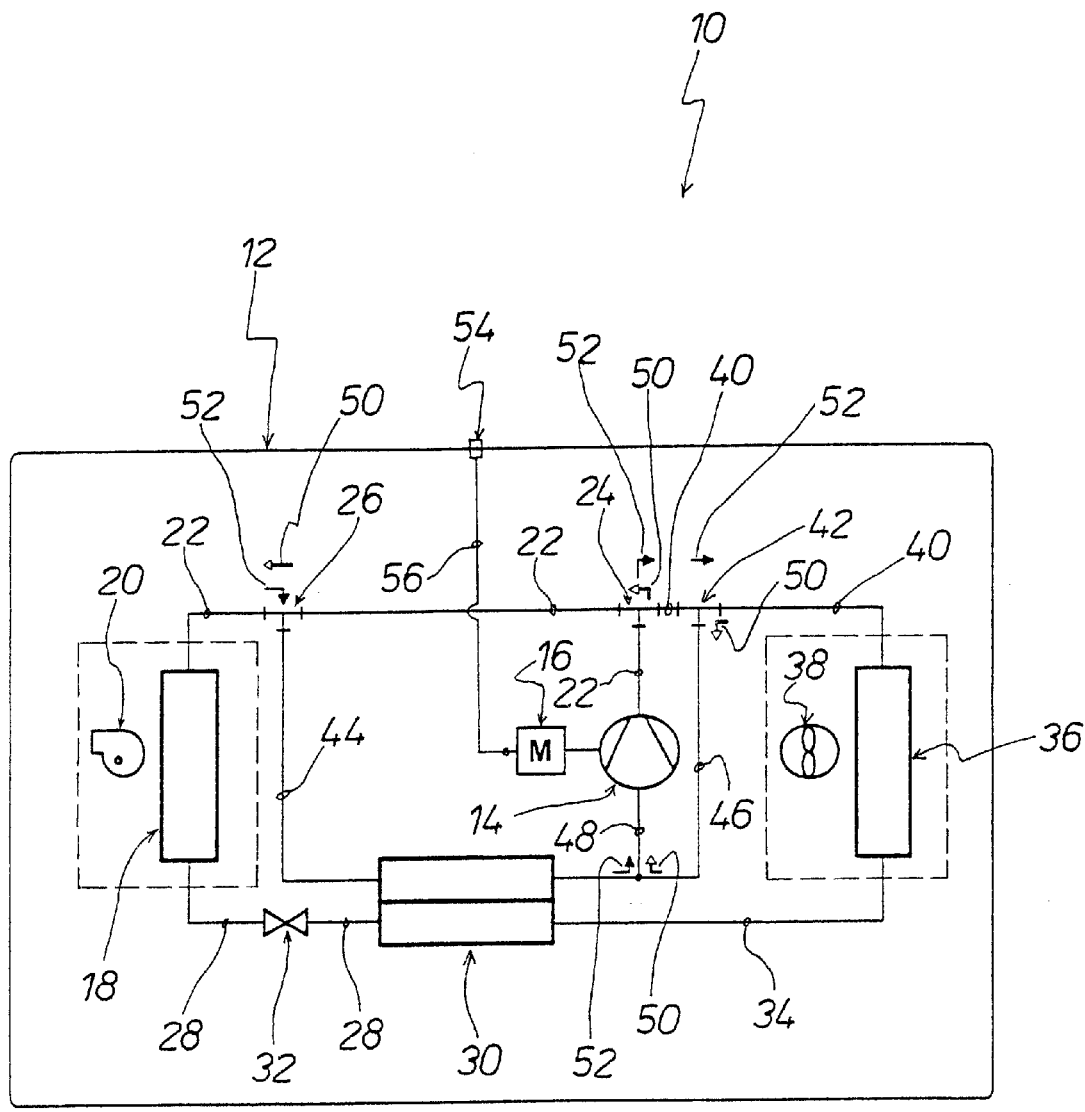
FIG. 1, a diagrammatical representation of one embodiment of the cooling and heating device.

FIG. 1 shows a schematic diagrammatical representation of one embodiment of the device 10 for cooling and for heating a motor vehicle. The device 10 is realized in the form of a self-sufficient flat module 12 and contains a compressor 14 with a compressor drive 16. The compressor 14 consists of a high-output carbon dioxide compressor that has a small structural volume. The carbon dioxide compressor 14 and the compressor drive 16 are integrated into the module 12. The device 10 or the module 12, respectively, also comprises an interior heat exchanger 18 with an assigned blower 20. The interior heat exchanger 18 is connected to the compressor 14 via a first pipeline 22. A first valve 24 and a second valve 26 are arranged in the first pipeline 22.

The interior heat exchanger 18 is connected to an internal heat exchanger 30 via a second pipeline 28. An expansion element 32 is arranged in the second pipeline 28. The device 10 may also be realized without heat exchanger 30 or the heat exchanger 30 may be integrated into the device 10 differently.

In the embodiment shown, the internal heat exchanger 30 of the device 10 is connected to an exterior heat exchanger 36 with an assigned fan 38 via a third pipeline 34. The exterior heat exchanger 36 is connected to the first valve 24 via a fourth pipeline 40. A third valve 42 is arranged in the fourth pipeline 40. The second valve 26 is connected to the internal heat exchanger 30 via a fifth pipeline 44. The third valve 42 is connected to the internal heat exchanger 30 via a sixth pipeline 46. A seventh pipeline 48 that is connected to the compressor 14 branches off the sixth pipeline 46.

The heating mode of the device 10 is indicated by the arrows 50, wherein the first, the second and the third valve 24, 26 and 42 respectively assume the corresponding position. In the cooling mode that is indicated by the arrows 52, the valves 24, 26 and 42 respectively assume a different position.

Figure 2:
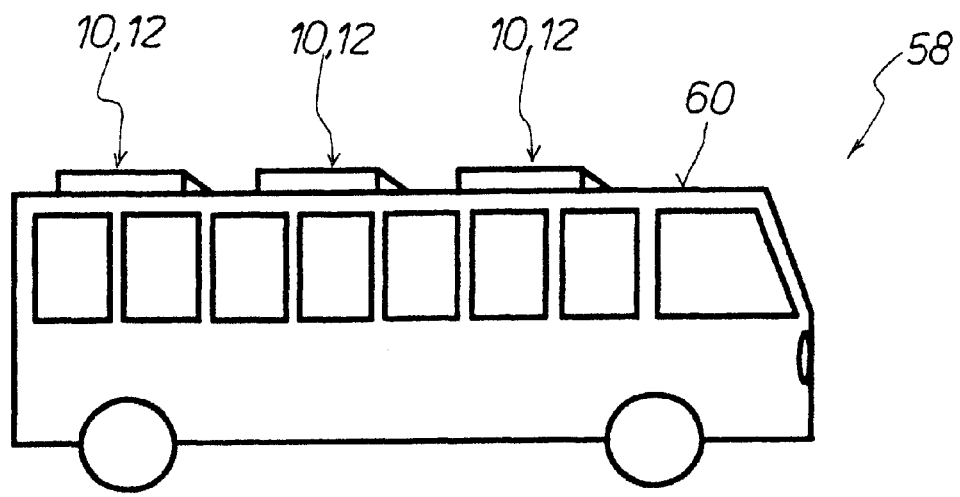
FIG. 2, a side view of a conventional bus with a series of devices according to FIG. 1 mounted on its roof, and FIG. 3, a top view of the bus according to FIG. 2.
Figure 3:
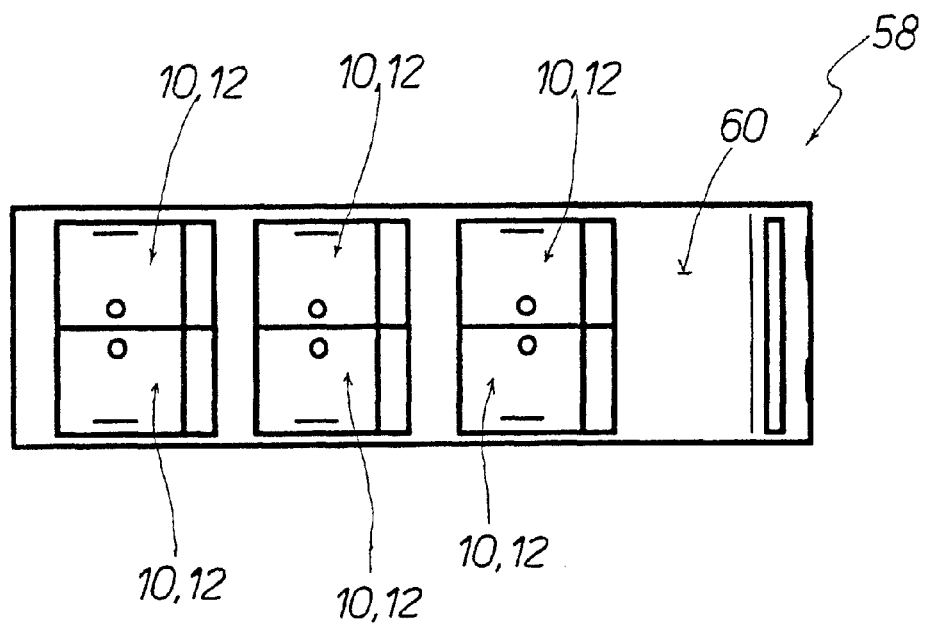

The module 12 contains an external electric energy connection 54 that is wired to the compressor drive 16 in the form of an electric motor. This is indicated by the thin line 56. The electric energy connection 54 is also wired to the blower 20 and the fan 38. The compressor drive 10 [sic; 16] may, for example, be supplied with a 380 V three-phase current, and the electric drives of the blower 20 and the fan 38 may, for example, be supplied with 24 V d.c. current. The module 12 consists of a self-sufficient flat module. FIGS. 2 and 3 schematically show a motor vehicle 58 in the form of a conventional bus, on the roof 60 of which a number of modules 12 which corresponds to the required cooling and heating energy 58, in this case six modules 12, are mounted.

LIST OF REFERENCE SYMBOLS

10 Device
12 Module
14 Compressor (in 12)
16 Compressor drive (for 14)
18 Interior heat exchanger (in 12)
20 Blower (at 18)
22 First pipeline (between 14 and 18)
24 First valve (in 22)
26 Second valve (in 22)
28 Second pipeline (between 18 and 30)
30 Internal heat exchanger (in 12)
32 Expansion element (in 28)
34 Third pipeline (between 30 and 36)
36 Exterior heat exchanger (in 12)
38 Fan (at 36)
40 Fourth pipeline (between 36 and 24)
42 Third valve (in 40)
44 Fifth pipeline (between 26 and 30)
46 Sixth pipeline (between 42 and 30)
48 Seventh pipeline (between 46 and 14)
50 Arrows (heating mode)
52 Arrows (cooling mode)
54 Electric energy connection (of 12)
56 Wiring (between 54 and 16)
58 Motor vehicle
60 Roof (of 58)

What is claimed is:

1. A climate control system for a motor vehicle, comprising:
    a compressor and a corresponding compressor drive, the compressor being a carbon dioxide compressor;
    an interior heat exchanger;
    an expansion element;
    an exterior heat exchanger;
    the compressor, compressor drive, interior heat exchanger, exterior heat exchanger, and expansion element being in a flat module that is structured and arranged to mount to a roof of the vehicle, the module capable of functioning as a heat pump and having a cooling mode and a heating mode;
    the module having an energy connection.

2. The climate control system of claim 1 wherein the compressor has an external power control.

3. The climate control system of claim 1 wherein the compressor has a diameter of 100–120 mm.

4. The climate control system of claim 1 wherein the energy connection comprises at least one voltage level.

5. The climate control system of claim 1 wherein the compressor drive comprises a d.c. electric motor.

6. The climate control system of claim 1 wherein the compressor drive comprises a three-phase electric motor.

7. The climate control system of claim 1 wherein the energy connection comprises a hydraulic connection.

8. The climate control system of claim 1 wherein the energy connection comprises a pneumatic connection.

9. The climate control system of claim 1 wherein the compressor drive comprises hermetic drive.

10. The climate control system of claim 1 wherein the compressor drive comprises a semi-hermetic drive.

11. The climate control system of claim 1 wherein the compressor drive comprises an open drive.

12. The climate control system of claim 1 wherein the expansion element comprises a capillary tube.

* * * * *